United States Patent [19]

Kessener et al.

[11] Patent Number: 4,901,922

[45] Date of Patent: * Feb. 20, 1990

[54] METHOD AND APPARATUS FOR CREATING A SPECTACULAR DISPLAY

[76] Inventors: Herman P. M. Kessener, Van Slichtenhorststraat 13, 6524 JH Nijmegen; Georgius J. C. L. Bruls, Van Somerenstraat 26, 6521 BS Nijmegen, both of Netherlands

[*] Notice: The portion of the term of this patent subsequent to Jun. 7, 2005 has been disclaimed.

[21] Appl. No.: 200,518

[22] Filed: May 26, 1988

Related U.S. Application Data

[63] Continuation-in-part of Ser. No. 822,417, Dec. 30, 1985, Pat. No. 4,749,126.

[30] Foreign Application Priority Data

May 9, 1984 [NL] Netherlands ........................ 8401479
Mar. 18, 1985 [AU] Australia ............................. PG9786

[51] Int. Cl.$^4$ ..................... B05B 17/04; B05B 17/08
[52] U.S. Cl. ....................................... 239/12; 239/18; 239/71; 239/75; 239/289; 239/590; 362/32; 362/96; 362/802
[58] Field of Search ................... 239/4, 12, 18–20, 239/71, 75, 102.1, 102.2, 289, 590; 362/32, 96, 802, 25

[56] References Cited

U.S. PATENT DOCUMENTS

| | | | |
|---|---|---|---|
| 1,553,743 | 9/1925 | Bluebaugh | 362/25 |
| 1,626,037 | 4/1927 | Holt | 239/18 |
| 1,839,994 | 1/1932 | Proffatt | 239/18 |
| 1,977,997 | 10/1934 | Patterson | 239/18 |
| 2,034,792 | 3/1936 | Bergman | 239/18 |
| 2,623,367 | 12/1952 | Morrison | 239/29 |
| 2,726,116 | 12/1955 | Barber | 239/18 |
| 3,866,832 | 2/1975 | Noguchi | 239/18 |
| 4,749,126 | 1/1988 | Kessener et al. | 239/12 |

FOREIGN PATENT DOCUMENTS

| | | | |
|---|---|---|---|
| 2562637 | 10/1985 | France | 239/18 |
| 2099125 | 12/1982 | United Kingdom | 239/18 |

Primary Examiner—Andres Kashnikow
Assistant Examiner—Michael J. Forman
Attorney, Agent, or Firm—Roy W. Butrum

[57] ABSTRACT

A stream of liquid is formed having a substantially smooth outer boundary surface contacting ambient atmosphere, and light is introduced into the steam closely adjacent the formation of the stream and in the direction of flow of the stream to be guided downstream by total internal reflection of light in the stream. Exit of light from the stream may be controlled by modifying the outer boundary surface of the stream or by introducing matter into the stream. The light is varied automatically in accordance with the temperature of the liquid in the stream to provide a visual perception of the temperature of the liquid.

36 Claims, 2 Drawing Sheets

METHOD AND APPARATUS FOR CREATING A SPECTACULAR DISPLAY

CROSS-REFERENCE TO RELATED APPLICATION

This application is a continuation-in-part of our copending application Ser. No. 822,417, filed Dec. 30, 1985, now U.S. Pat. No. 4,749,126, issued June 7, 1988.

BACKGROUND OF THE INVENTION

The invention relates to a method and apparatus for creating a spectacular display involving the release of light from a flowing liquid stream such as water. The broad concepts may be employed in various applications such as fountain nozzles and hose nozzles, and the invention is also directed particularly to a water faucet installation.

It is well-known to provide light in connection with flowing water such as in fountains wherein the light provides an attractive visual effect, especially when the surrounding area is dark. Examples of prior devices for producing such effects are shown in U.S. Pat. Nos. 1,626,037; 1,839,994; 2,034,792; 2,623,367; 3,702,172; 3,866,832; and U. K. patent No. 2,099,125. Such prior art devices have the disadvantage that the light is not used efficiently and there is considerable light loss. Furthermore, these known devices do not provide the unique visual effect obtained with the present invention.

The invention is furthermore directed to a faucet of the type wherein the hot and cold water are selectively mixed by suitable control means to provide water of a desired temperature at a discharge opening. The temperature of the water is usually determined by placing a hand in the stream of water to feel the temperature. It is possible to scald one's hand by testing the temperature in this manner, and accordingly, faucets have been made with built in digital temperature indicating means to prevent such an occurrence. Another solution to the problem in the prior art is the provision of a thermostat to limit the maximum temperature of the water discharged from the faucet.

SUMMARY OF THE INVENTION

The invention is based on the same general principles as disclosed in our copending U. S. patent application Ser. No. 822,417, the disclosure of which is incorporated herein by reference. A stream of substantially non-turbulent liquid such as water is formed having a substantially smooth outer boundary surface in contact with ambient air, and light is introduced into the stream of liquid such that the light is guided downstream within the liquid by the phenomenon of total internal reflection of light in the stream. The spectacular display may be obtained by controlling the exit of light from the liquid stream by selectively modifying the outer boundary surface of the stream to cause light to pass out of the stream.

The invention avoids the necessity of physically feeling the temperature of the water issuing from a faucet in order to determine if it is at a desired temperature by providing a novel visual indication of the temperature. The light issuing from the stream of water is varied to indicate different temperatures of the stream. A characteristic of the light such as the color or intensity of the light may be varied. For example, very cold water may be indicated by a dark blue color and very hot water may be indicated by a bright red color. Intermediate temperatures may be indicated by intermediate shades of the selected colors. The intensity of the light may also be varied such that low intensity light indicates cold water and high intensity light indicates hot water, with intermediate temperatures being indicated by intermediate degrees of intensity of light. Furthermore, the temperature may be indicated by varying the areas at which light exits from the stream.

The temperature of the water is sensed, and the light emitted from the stream is automatically varied in accordance with the sensed temperature.

The light is introduced into the liquid stream in such a manner that a substantial portion and preferably substantially all of the light is initially guided downstream within the liquid to minimize any light loss.

The outer boundary surface of the stream may be modified in various ways. In one form of the invention, one or more obstructions are placed in the path of flow of a portion of the outer boundary surface of the stream so as to create turbulence in the direction of flow of the stream. In another form of the invention, a means is moved laterally through the stream to create turbulence in a direction laterally of flow of the stream. The outer boundary surface may also be modified by providing vibrations in the liquid medium. Additionally, air bubbles or particulate matter may be introduced into the liquid to cause escape of light from the liquid stream. In each case, a unique visual effect is obtained which is different from those produced in the prior art.

DETAILED DESCRIPTION OF THE INVENTION

Figures 1, 6:
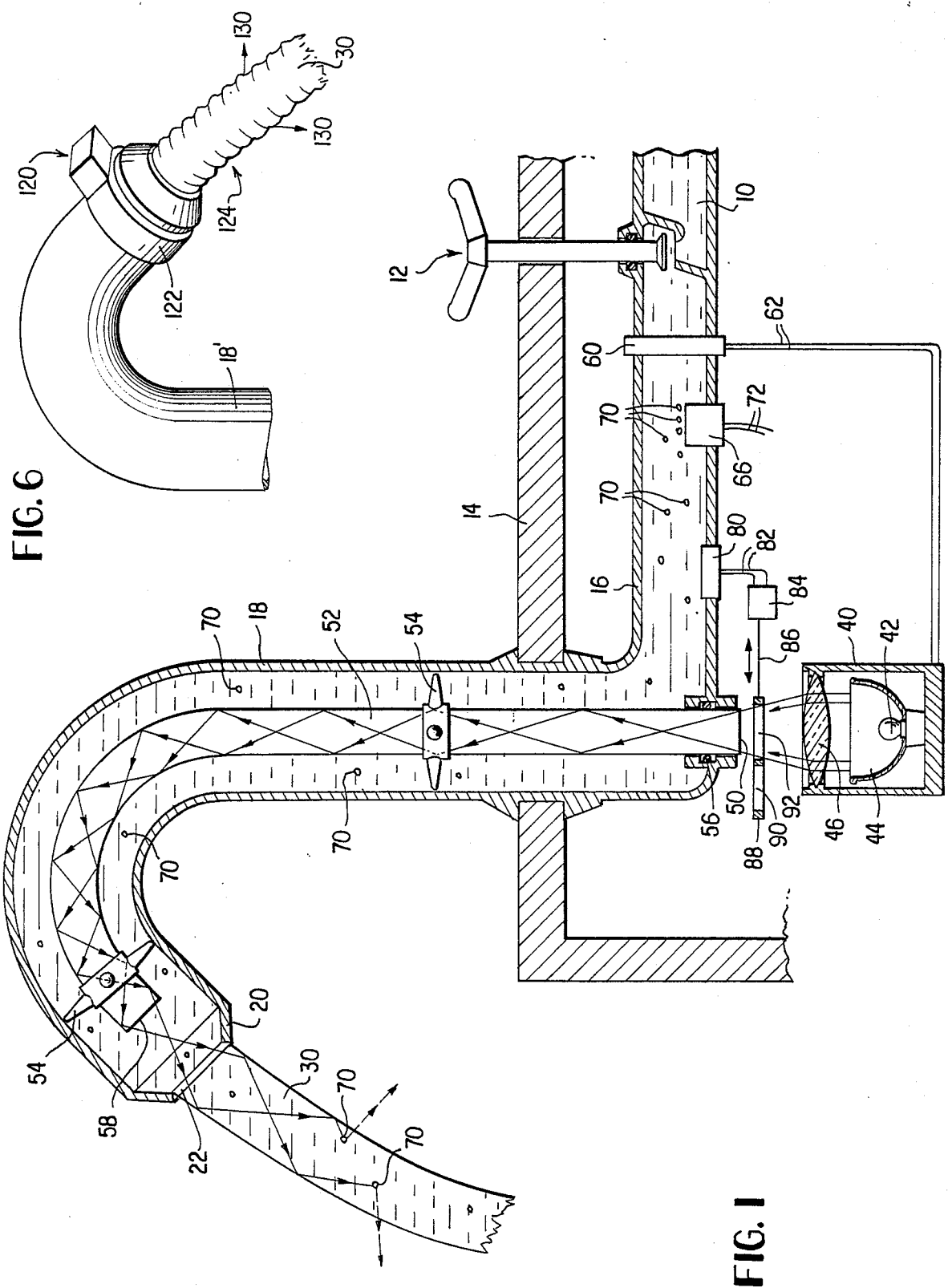
FIG. 1 is a somewhat schematic cross-sectional view through a faucet installation according to the present invention.
FIG. 6 is a view similar to FIG. 5 illustrating yet another modified form of the invention.

Referring now to the drawings wherein like reference characters designate corresponding parts throughout the several views, there is shown in FIG. 1 an inlet 10 connected to a conventional source of hot and cold water. Reference character 12 designates schematically a control means for controlling both water flow and the temperature of the water flowing through the faucet. This may comprise a single handle as employed in ceramic-disk type faucets or a combination hot and cold faucet employing two handles so as to enable the mixing of hot and cold water to obtain any desired temperature according to the position of the handles. Control means 12 extends upwardly through the top wall 14 of a bathroom vanity or the like. It is apparent that the faucet may be mounted in a variety of ways in many different types of environments.

Water passes downstream from the control means through conduit 16 thence upwardly through a spout portion 18 which also extends through wall 14 and is supported thereby. Spout portion terminates in a tapered nozzle 20 having a discharge opening 22. This nozzle provides a stream of water 30 which is substantially non-turbulent as it leaves the discharge opening, and this stream will tend to remain non-turbulent for a substantial distance downstream from the nozzle as it arches downwardly under the influence of gravity as shown. The stream has a substantially homogeneous cross-section into which air bubbles or particulate matter and the like may be introduced to form discontinuities in the stream as hereinafter described.

The outer boundary surface of the stream is of course in contact with the ambient atmosphere, and this surface is substantially smooth and continuous circumferentially of the stream. Circumferentially is intended to denote the dimension extending around the stream which may have a generally circular cross-section or any other cross-section such as in the case of a ribbon-like stream.

A source of light includes a housing 40 having a suitable quartz-halogen lamp 42 surrounded by a reflector 44. A lens 46 is supported by the housing for concentrating the radiated light rays into the lower end 50 of a light guide 52 which comprises a clear transparent rod of polymethyl methacrylate supported within spout portion 18 by spacer elements 54 disposed at spaced intervals along its length. The light is guided within rod 52 by total internal reflection, the index of refraction of polymethyl methacrylate and water being 1.49 and 1.33 respectively. The light guide may be of various materials and constructions as is well-known in the art. A light guide that is particularly suitable comprises a clear glass rod with a glass cladding having a lower index of refraction than the rod. This eliminates any problems due to staining. The light guide may also be made of glass fibers or synthetic fibers, and may be of a fluid filled construction as is well-known in the art.

The portion of the rod 52 adjacent lower end 50 thereof passes through an opening formed in conduit 16 and is sealed with respect thereto by an O-ring 56. The outer end 58 of rod 5 terminates closely adjacent to the discharge opening 22 so as to introduce light directly into the liquid flowing through the discharge opening and forming the stream, the light being introduced in the direction of liquid flow in the stream in such a manner that a substantial portion and preferably substantially all of the light strikes the outer boundary surface of the stream at an angle of incidence greater than or equal to the critical angle for the media so that the light is guided downstream within the liquid by the phenomenon of total internal reflection of light in the stream.

Light of a certain intensity is introduced directly into the liquid forming the stream at its emergence into ambient atmosphere in such a manner that is initially guided downstream within the liquid of the stream at substantially the same intensity. It is noted that the source of light is hidden from view and the light introduced into the stream is not visible until it exits from the stream in a controlled manner.

Means is provided for automatically turning the light source on and off in accordance with operation of the faucet. A conventional flow switch 60 is provided which is adapted to sense flow of liquid through conduit 16. The flow switch is supported by the conduit and is connected in a suitable electrical circuit (not shown) including leads 62 connecting the flow switch with lamp 42. When the flow switch senses flow of water in conduit 16, the switch is operated to cause the lamp to turn on. When the flow of water ceases, the switch is operated to turn the lamp off. Accordingly, the lamp is turned on only when the faucet is in use.

A conventional air bubble generating means 66 is supported by conduit 16 and is adapted to release air bubbles 70 into the water flowing through the conduit. In order to control the operation of the generating means 66, it is connected in a suitable electrical circuit (not shown) by leads 72, and may also be connected to flow switch 60 so that the bubble generating means is turned on and off along with the lamp by operation of the flow switch.

Bubbles 70 introduced into the water are carried downstream in the water and thence into the stream issuing from nozzle 20. The path of the light rays through rod 52 and into the stream is indicated by the arrows, and it will be noted that some light rays guided inside stream 30 will be deflected by the air bubbles. Some of these deflected light rays strike the outer boundary surface of the stream at an angle of incidence smaller than the critical angle for the media and are thus refracted out of the stream. This light can be seen by an observer, the visual effect being that of colored sparks moving with the stream of water, as hereinafter more fully explained.

A temperature sensing means 80 is supported on conduit 16 and is in communication with the water in the conduit to sense the temperature of the water. The temperature sensing means may be of any conventional construction such as bimetallic means, memory-metal means, fluid-containing systems utilizing coefficient of expansion or electronic devices and the like. This sensing means is connected in a suitable electrical circuit (not shown) including leads 82 connected to an operating means 84 such as a solenoid or the like which is adapted to move a member 86 back and forth in the direction of the arrows in accordance with the temperature of the water.

Member 86 is connected to a frame 88 which moves back and forth along with member 84 and which is shown as carrying a pair of light filters 90 and 92 for varying a particular characteristic of the light which passes therethrough into light guide 52 and thence into the stream of water passing out through the discharge opening of the faucet. These filters may, for example, be red and blue color filters having varying densities thereacross so that light passing therethrough will have varying shades of red and blue depending on the position of the filters. The arrangement is preferably such that when the water is very cold, the color of the light introduced into the stream 30 is a dark blue, and when the water is very hot, the color is bright red. Intermediate shades of blue and red will indicated intermediate temperatures.

It is apparent that the filters may be varied to provide various colors or degrees of intensity of light, and may provide any range of colors, e.g. red-purple; any range of intensities of light, e.g. dim red-bright red; shades of color, e.g. dark red-bright red; shades of white light, e.g. dark-gray-white etc. Other colors such as yellow and green may also be employed. In each case, the color or intensity of the light is varied so as to provide a visual indication of the temperature of the water. Other means may be employed for varying a particular characteristic of the light introduced into stream 30. For example, a lamp may be employed which has varying light characteristics according to the voltage applied thereto, and the applied voltage may be varied according to the temperature of the water.

The color filters may also be mounted within conduit 16 so as to be immersed in the liquid whereby the color filters will be cooled by the liquid. In such a construction, the lower end 50 of the light guide is positioned within the conduit 16, and a window is placed in the wall of the conduit through which light can shine to pass through the filters into the lower end of the light guide.

As mentioned previously, the air bubbles will appear as colored sparks when the light is colored, thereby enabling an observer to determine the temperature of the water by sight at all times.

As an alternative to the provision of an air bubble generator, conventional means may be provided in place of the air bubble generator for introducing particulate matter into the water. Such particulate matter will operate in a manner similar to the air bubbles, deflecting some of the light rays so that some of the deflected rays will be refracted out of the stream.

The source of light and the means for varying a particular characteristic of the light such as the color thereof including the temperature sensing means have been shown as mounted at a location remote from the discharge nozzle of the faucet. Although this arrangement is considered preferable, it should be understood that the source of light and the means for varying a particular characteristic of the light including the temperature sensing means may be mounted within the spout adjacent the discharge opening of the nozzle to introduce light into the stream at the same position as the outer end 58 of rod 52. In such a case, the components may be hydrodynamically formed so as to ensure that the stream 30 has a substantially smooth outer boundary surface, and the components may be mounted on a hollow conduit which would replace rod 54. The electrical connections to the components could extend through such hollow conduit. Furthermore, in this latter case, the color filter may be in direct contact with the liquid; and the color filter may have inherent temperature-dependent characteristics, thereby eliminating the need for a separate temperature sensing means.

Additionally, the air bubble generator or particulate matter dispenser may be located adjacent the discharge opening of the nozzle and hydrodynamically formed so as to ensure that the stream has a substantially smooth outer boundary surface.

The spectacular display is created by controlling the exit of light from the stream. This may be accomplished in a number of ways. The utilization of air bubbles and particulate matter to cause the escape of light from the stream has been described above. It is noted that where the stream is substantially non-turbulent with a substantially smooth outer boundary surface in contact with ambient air and no air bubbles or particulate matter are introduced, the stream may function as a perfect light guide and no light is emitted from the stream. Therefore, no light will be visible until the outer boundary surface is modified as by striking a wash basin which will produce a spectacular release of light.

Figure 2:
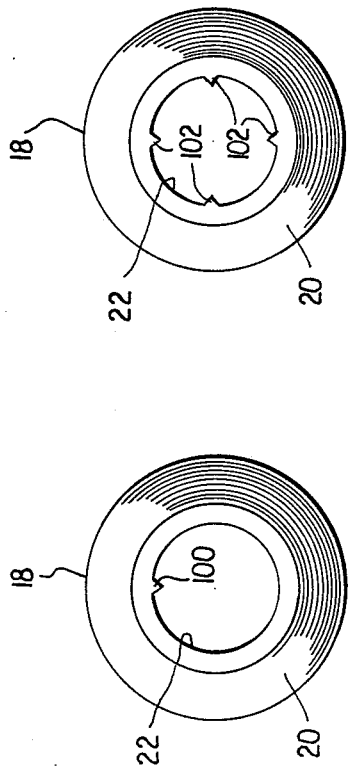
FIG. 2 is an end view of a modified form of faucet nozzle.

The display may also be controlled by modifying the outer boundary surface of the stream so that light within the stream will strike certain portions of the outer boundary surface at an angle less than the critical angle. This can be done by selectively creating turbulence in a certain manner to create the desired effect. As seen in FIG. 2, the nozzle may be provided with an inwardly extending projection 100 so that as the stream exits from the discharge opening 22, a narrow strip of turbulence will be created in the outer boundary surface of the stream and extending in the direction of flow of the stream. This strip of turbulence enables light to escape from the stream since the conditions for total internal reflection are not met. The visual effect is a strip of light extending along the stream.

Figure 3:
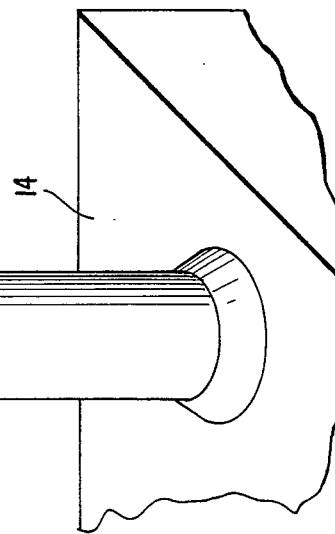
FIG. 3 is an end view of a further modified form of faucet nozzle.
Figure 4:
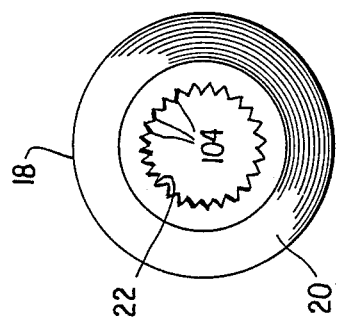
FIG. 4 is an end view of another modified form of the faucet nozzle.

As seen in FIG. 3, a modified nozzle is provided with four equally spaced inwardly extending projections 102 each of which operates in the same manner as projection 100, whereby the visual effect is four strips of light extending along the stream and equally spaced about the circumference of the stream. FIG. 4 illustrates a further modification wherein the discharge opening is provided with a large number of inwardly extending projections 104 so that the discharge opening may be said to have a serrated edge. This construction provides numerous strips of light along the stream, and the entire stream will appear to glisten. It is apparent that various obstructions may be placed in the path of flow of the stream to create turbulence. Such obstructions may be formed integral with the nozzle, or they may be separately supported in position to engage the stream.

Figure 5:
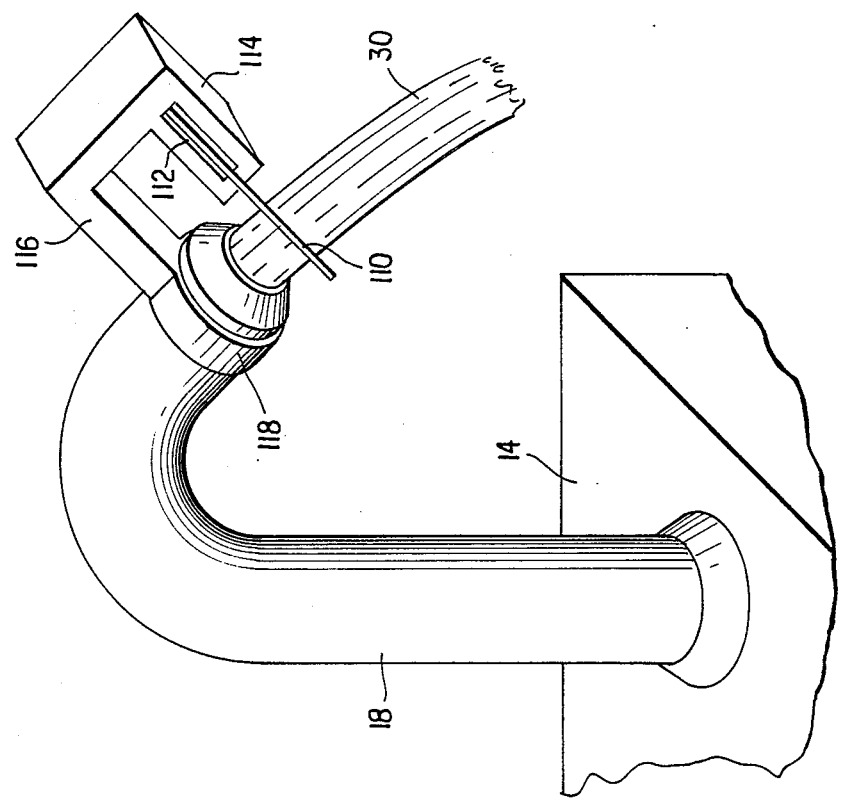
FIG. 5 is a top perspective view of still another modified form of the invention.

Referring now to FIG. 5, means is provided for creating turbulence in the stream in a direction laterally of the direction of flow of the stream. A member 110 such as a wire or the like extends through a slot 112 formed in a housing 114 having mounted therein a suitable electrical device for oscillating the wire back and forth such that it moves laterally through the stream in a direction substantially at a right angle to the direction of flow of the stream. A control means (not shown) may be provided for causing the electrical device to be operated as desired. Housing 114 is connected to a support member 116 which is in turn attached to the outer end of spout portion 18 by strap 118 connected to the support member and extending around the spout portion.

In operation, when member 110 is passed through the stream, turbulence is produced throughout the cross-sectional area of the stream and along a narrow band extending circumferentially around the outer boundary surface of the stream. The visual effect is a band of light moving along the stream at the rate of flow of the stream.

Referring now to FIG. 6, means is provided for modifying the outer boundary surface of the stream by producing vibrations in the liquid medium adjacent the formation of the stream. Spout 18' corresponds to spout 18 of FIG. 5. In tis form of the invention, a housing 120 is supported on the spout adjacent the discharge end thereof by a strap 122. Housing 120 has mounted therein a suitable means for creating vibrations which are coupled into the liquid medium to produce vibrations therein. These vibrations result in an undulating outer boundary surface as indicated by reference character 124. This undulating surface will provide certain areas where the conditions for total internal reflection are not met, and light will exit from the stream as typically indicated by arrows 130.

The means for creating vibrations may comprises a conventional piezoelectric device or conventional means for producing sound waves in the sonic or ultrasonic region. The means for creating vibrations may also be located within the spout if desired.

The frequency of the vibrations may be varied in accordance with the temperature of the liquid medium by connecting the vibrations producing means in a suitable electric circuit (not shown) containing temperature sensing means 80. Thus, the temperature may be determined by the pattern of light emitted from the stream.

The vibrations may also be provided in bursts so that light will be emitted from the stream over a distinct portion of the stream. This portion will move along the stream at the rate of flow of the stream.

The invention has been described with reference to preferred embodiments. Obviously, modifications, alterations and other embodiments will occur to others upon reading and understanding this specification. It is our intention to include all such modifications, alterations and alternate embodiments insofar as they come within the scope of the appended claims or the equivalent thereof.

What is claimed is:

1. The method of creating a spectacular display comprising the steps of forming an elongated stream comprising a body of liquid medium having a first index of refraction into a medium which is ambient atmosphere having a second index of refraction lower than the first index of refraction to provide a substantially smooth continuous outer boundary surface enclosing the stream and contacting the ambient atmosphere, introducing light of a certain intensity directly into the body of liquid forming the stream closely adjacent the formation of the stream at its emergence into ambient atmosphere and in the direction of liquid flow in the stream in such a manner that light striking the outer boundary surface at an angle of incidence greater than or equal to the critical angle for the media is initially guided downstream within the liquid at substantially the same intensity by the phenomenon of total internal reflection of light in the stream, and creating a spectacular display by controlling the exit of light from the stream.

2. The method as defined in claim 1 wherein the exit of light is controlled by modifying the outer boundary surface of the stream so that light within the stream will strike certain portions of the outer boundary surface at an angle less than said critical angle.

3. The method as defined in claim 2 wherein the outer boundary surface is modified by the creation of turbulence in the stream.

4. The method as defined in claim 3 wherein the turbulence is created in said outer boundary surface in the direction of flow of the stream.

5. The method as defined in claim 4 wherein the turbulence is created by placing an obstruction in the path of flow of a portion of said outer boundary surface.

6. The method as defined in claim 3 wherein the turbulence is created in said outer boundary surface in a direction laterally of the flow of the stream.

7. The method as defined in claim 6 wherein the turbulence is created by moving a means laterally into the stream to create turbulence.

8. The method as defined in claim 2 wherein the outer boundary surface is modified by providing vibrations in the liquid medium adjacent the formation of the stream to form undulations in said outer boundary surface extending in the direction of liquid flow in the stream.

9. The method as defined in claim 1 wherein the exit of light from the stream is controlled by providing air bubbles in the liquid.

10. The method as defined in claim 1 wherein the exit of light from the stream is controlled by providing particulate matter in the liquid.

11. The method as defined in claim 1 wherein the light is provided at a location remote from the formation of the stream at its emergence into ambient atmosphere, and guiding the light to the, point where it is introduced into the stream.

12. The method as defined in claim 1 including the step of varying the light uniformly throughout the body of liquid in accordance with the temperature of the liquid in the stream to provide a visual perception of the temperature of the liquid.

13. The method as defined in claim 12 including the steps of sensing the temperature of the liquid and automatically varying a characteristic of the light in accordance with the sensed temperature.

14. The method as defined in claim 13 wherein the characteristic of the light which is varied is the color of the light.

15. The method as defined in claim 13 wherein the characteristic of the light which is varied is the intensity of the light.

16. The method as defined in claim 1 including the step of controlling the introduction of light in accordance with flow of liquid.

17. The method as defined in claim 16 including the steps of sensing the flow of liquid and introducing light into the liquid when flow of liquid is sensed.

18. Apparatus for creating a spectacular display comprising means for forming an elongated stream comprising a body of liquid medium having a first index of refraction into a medium which is ambient atmosphere having a second index of refraction lower than the first index of refraction to provide a substantially smooth continuous outer boundary surface enclosing the stream and contacting the ambient atmosphere, means for introducing light of a certain intensity directly into the body of liquid forming the stream closely adjacent the formation of the stream at its emergence into ambient atmosphere and in the direction of liquid flow in the stream in such a manner than light striking the outer boundary surface at an angle of incidence greater than or equal to the critical angle for the media is initially guided downstream within the liquid at substantially the same intensity by the phenomenon of total internal reflection of light in the stream, and means for creating a spectacular display by controlling the exit of light from the stream.

19. The method of creating a spectacular display comprising the steps of forming a solid elongate stream of substantially non-turbulent liquid medium having a first index of refraction into a medium which is ambient atmosphere having a second index of refraction lower than the first index of refraction to provide a substantially smooth outer boundary surface of the stream contacting the ambient atmosphere, introducing light into the liquid forming the stream closely adjacent the formation of the stream at its emergence into ambient atmosphere and in the direction of flow of the stream so that light which enters the stream to strike the outer boundary surface at an angle of incidence greater than or equal to the critical angle for the media is guided downstream within the stream by the phenomenon of total internal reflection of light in the stream, creating a spectacular display by controlling the exit of light from the stream, and varying the light in accordance with the temperature of the liquid in the stream to provide a visual perception of the temperature of the liquid.

20. The method as defined in claim 19 including the steps of sensing the temperature of the liquid and automatically varying a characteristic of the light in accordance with the sensed temperature.

21. The method as defined in claim 20 wherein the characteristic of the light which is varied is the color of the light.

22. The method as defined in claim 20 wherein the characteristic of the light which is varied is the intensity of the light.

23. The method as defined in claim 19 including the step of controlling the introduction of light in accordance with flow of said liquid.

24. The method as defined in claim 19 including the steps of sensing the flow of liquid and introducing light into the liquid when flow of liquid is sensed.

25. The method as defined in claim 19 wherein the exit of light is controlled by modifying the outer boundary surface of the stream so that light within the stream will strike certain portions of the outer boundary surface at an angle less than said critical angle.

26. The method as defined in claim 25 wherein the outer boundary surface is modified by the creation of turbulence in the stream.

27. The method as defined in claim 26 wherein the turbulence is created in said outer boundary surface in the direction of flow of the stream.

28. The method as defined in claim 27 wherein the turbulence is created by placing an obstruction in the path of flow of a portion of said outer boundary surface.

29. The method as defined in claim 26 wherein the turbulence is created in said outer boundary surface in a direction laterally of the flow of the stream.

30. The method as defined in claim 29 wherein the turbulence is created by moving a means laterally into the stream to create turbulence.

31. The method as defined in claim 25 wherein the outer boundary surface is modified by providing vibrations in the liquid medium adjacent the formation of the stream.

32. The method as defined in claim 31 wherein the frequency of said vibrations are varied in accordance with the temperature of the liquid in the stream.

33. The method as defined in claim 19 wherein the exit of light from the stream is controlled by providing air bubbles in the liquid.

34. The method as defined in claim 19 wherein the exit of light from the stream is controlled by providing particulate matter in the liquid.

35. The method as defined in claim 19 wherein light is provided at a location remote from the formation of the stream at its emergence into ambient atmosphere, and guiding the light to the point where it is introduced into the stream.

36. Apparatus for creating a spectacular display comprising means for forming a solid elongate stream of substantially non-turbulent liquid medium having a first index of refraction into a medium which is ambient atmosphere having a second index of refraction lower than the first index of refraction to provide a substantially smooth outer boundary surface of the stream contacting the ambient atmosphere, means for introducing light into the liquid forming the stream closely adjacent the formation of the stream at its emergence into ambient atmosphere and in the direction of flow of the stream so that light which enters the stream to strike the outer boundary surface at an angle of incidence greater than or equal to the critical angle for the media is guided downstream within the stream by the phenomenon of total internal reflection of light in the stream, means for creating a spectacular display by controlling the exit of light from the stream, and means for varying the light in accordance with the temperature of the liquid in the stream to provide a visual perception of the temperature of the liquid.

* * * * *